United States Patent
Sato et al.

(10) Patent No.: US 10,118,489 B2
(45) Date of Patent: Nov. 6, 2018

(54) HEAD-UP DISPLAY DEVICE

(71) Applicant: NIPPON SEIKI CO., LTD., Niigata (JP)

(72) Inventors: Genichiro Sato, Niigata (JP); Takanori Shigeno, Niigata (JP); Hiroyuki Furusawa, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 15/527,527

(22) PCT Filed: Nov. 12, 2015

(86) PCT No.: PCT/JP2015/081817
§ 371 (c)(1),
(2) Date: May 17, 2017

(87) PCT Pub. No.: WO2016/080274
PCT Pub. Date: May 26, 2016

(65) Prior Publication Data
US 2017/0320390 A1  Nov. 9, 2017

(30) Foreign Application Priority Data

Nov. 17, 2014 (JP) .................................. 2014-232512

(51) Int. Cl.
*G02B 27/01* (2006.01)
*B60K 35/00* (2006.01)

(52) U.S. Cl.
CPC .............. *B60K 35/00* (2013.01); *G02B 27/01* (2013.01); *G02B 27/0101* (2013.01); *G02B 27/0149* (2013.01); *G02B 2027/013* (2013.01); *G02B 2027/0118* (2013.01)

(58) Field of Classification Search
CPC . G02B 27/01; G02B 27/0101; G02B 27/0149
USPC ......................................................... 345/5–9
See application file for complete search history.

(56) References Cited

U.S. PATENT DOCUMENTS

2002/0084950 A1* 7/2002 Aoki .................. G02B 27/0101
345/7

FOREIGN PATENT DOCUMENTS

| JP | 04191790 A | * | 7/1992 |
|----|------------|---|--------|
| JP | 2002-202475 A | | 7/2002 |
| JP | 2004-017708 A | | 1/2004 |
| JP | 2011-247997 A | | 12/2011 |

(Continued)

OTHER PUBLICATIONS

Search Report issued in corresponding International Patent Application No. PCT/JP2015/081817, dated Jan. 12, 2016.

*Primary Examiner* — Carolyn R Edwards
(74) *Attorney, Agent, or Firm* — McDermott Will & Emery LLP

(57) ABSTRACT

This head-up display device according to an embodiment of the present invention is mounted on an instrument panel of a vehicle. A display means that emits display light is contained in a chassis having a light transmissive cover having a curved surface, and the display light emitted by the display means is output from the light transmissive cover. The curved surface of the light transmissive cover is curved so that the side on the front side of the vehicle is lower than the side on the back side of the vehicle, and that the curved surface is inclined toward the left-right direction of the vehicle so that a corner of the curved surface is lowest.

12 Claims, 2 Drawing Sheets

(56) References Cited

FOREIGN PATENT DOCUMENTS

JP           2011247997 A  * 12/2011
JP           2014-174308 A    9/2014

* cited by examiner

HEAD-UP DISPLAY DEVICE

CROSS REFERENCE

This application is the U.S. National Phase under 35 U.S.C. § 371 of International Application No. PCT/JP2015/081817, filed on Nov. 12, 2015, which claims the benefit of Japanese Application No. 2014-232512, filed on Nov. 17, 2014, the entire contents of each are hereby incorporated by reference.

TECHNICAL FIELD

The present invention relates to a head-up display device with an excellent mountability to vehicle.

BACKGROUND ART

In a conventional head-up display device which is mounted in an instrument panel of a vehicle, as disclosed in Patent Literature 1 for example, a window part of a chassis to which display light is to be emitted is covered with a light transmissive cover, and is constructed so as not to allow for entry of dust. In addition, the light transmissive cover that covers the window part is constructed to be curved in a longitudinal direction of a vehicle at an angle of inclination at which incident sunlight is reflected on a wall part of the instrument panel of the vehicle, so as not to dazzle persons inside and outside of the vehicle by the reflection of sunlight.

CITATION LIST

Patent Literature

Patent Literature 1: Japanese Unexamined Patent Application Publication No. 2004-17708

SUMMARY OF THE INVENTION

Problems to be Solved by the Invention

However, the instrument panel of the vehicle is often designed so as to be lower to the outside than a center of the vehicle, and when the light transmissive cover is curved in the longitudinal direction of the vehicle so that sunlight is reflected on the wall part of the instrument panel of the vehicle, if the curved shape is defined with reference to the lowest position of the wall part of the instrument panel of the vehicle, there may be a case in which the head-up display device must be housed at a deep position in the instrument panel, and there has been a room to be improved in mountability to vehicle.

The present invention has been made in view of the problem described above, and it is an object of the present invention to provide a head-up display device with an excellent mountability to vehicle.

Means for Solving the Problem

A head-up display device according to the present invention, that mounted to an instrument panel PNL of a vehicle, housing display means 1 for emitting display light L to a chassis 4 which has a light transmissive cover 42 having a curved surface, the head-up display device H emitting from the light transmissive cover 42 the display light that has been emitted from the display means 1, wherein the curved surface of the light transmissive cover 42 is curved so that a front side of the vehicle 42CF42OF is lower than a back side of the vehicle 42CB420B, and is inclined in leftward and rightward directions and inward and outward directions of the vehicle so that a corner 420F of the curved surface is lowest.

The head-up display device according to the present invention, preferably, an inclination in the leftward and rightward directions and the inward and outward directions of the vehicle of the curved surface is inclined so that a lateral outside of the vehicle 420F420B is lower than a lateral inside of the vehicle 42CF42CB.

The head-up display device according to the present invention, preferably, water discharge means 44 is provided at a periphery of a corner 420F which is lowest of the curved surface.

The head-up display device according to the present invention, preferably, wherein an erected wall is provided between the light transmissive cover 42 and an instrument panel PNL of the vehicle.

Effect of the Invention

According to the present invention, a head-up display device with an excellent mountability of vehicle can be provided.

BRIEF DESCRIPTION OF THE DRAWINGS

FIG. 1 (*a*) is a schematic view of the device in a case where it is seen from a side view of a vehicle, and FIG. 1 (*b*) is a schematic view of the device in a case where it is seen from a viewpoint of an occupant.

FIG. 3 (*a*) is an entire perspective view of the head-up display device, and FIG. 3 (*b*) is a perspective view of a light transmissive cover.

FIG. 4 (*a*) shows an example in which a water discharge port is provided as water discharge means, and FIG. 4 (*b*) shows an example in which a water discharge groove is provided as water discharge means.

FIG. 5 (*a*) is a schematic view in a case where the construction is seen from a side view of a vehicle, FIG. 5 (*b*) is a schematic view of the conventional construction in a case where it is seen from a back side of the vehicle, and FIG. 5 (*c*) is a schematic view in the embodiment in a case where the construction is seen from the back side of the vehicle.

MODE FOR CARRYING OUT THE INVENTION

Figure 1:
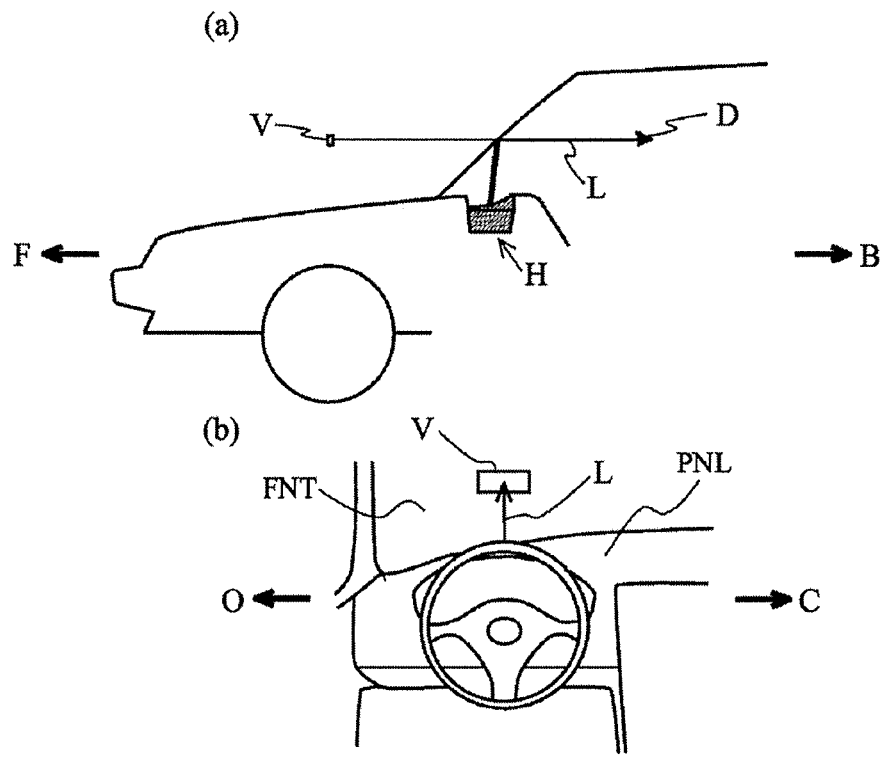
FIG. 1 is a schematic view showing a head-up display device according to an embodiment of the present invention.
Figure 2:
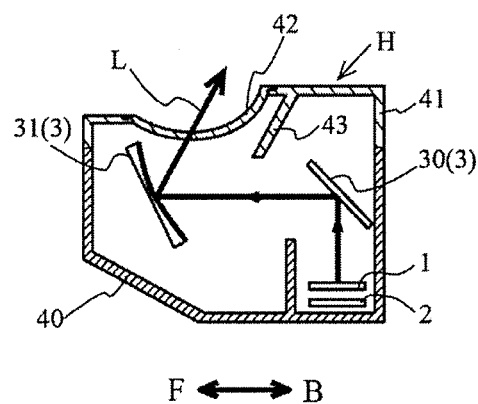
FIG. 2 is a structural schematic view of the embodiment.
Figure 3:
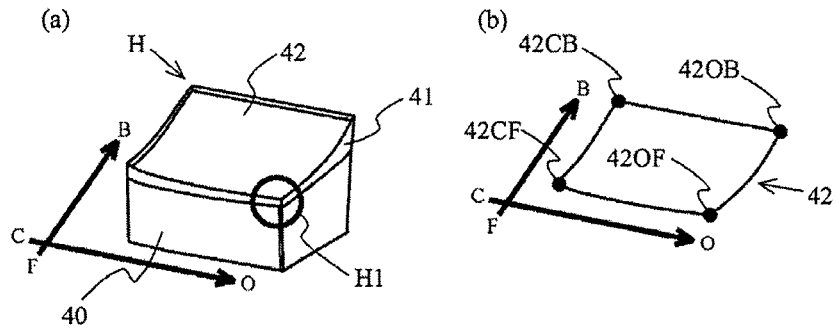
FIG. 3 is a perspective view of the embodiment.

Hereinafter, an embodiment in which the present invention is applied to a head-up display device to be mounted to a vehicle will be described with reference to the accompanying drawings. In addition, in the drawings, the following description will be furnished, presupposing that the front side of the vehicle is F, the back side of the vehicle is B, the inside of the vehicle is C, and the outside of the vehicle is O.

A head-up display device H of the embodiment is mainly composed of: a display (display means) 1 to emit display light L; a control board 2 to control the display 1; a reflection mirror 3; and a chassis 4 to house these members. The head-up display device H causes the reflection mirror 3 to reflect the display light L that is emitted from the display 1, according to control of the control board 2, and subsequently, projects the reflected light onto a front glass (projected member) FNT of the vehicle from a light transmissive cover (emission port) 43 of the chassis 4, and a virtual image V is thereby formed at a front side of the front glass FNT. The head-up display device H emits vehicle information such as a cruising speed of the vehicle, from the display 1 as the display light L, under the control of the control board 2, to thereby overlap a landscape outside the vehicle and the vehicle information that is displayed as the virtual image V and then cause a driver D to visually recognize what is going on.

The display 1 is a liquid crystal display having; a light source for backlight which consists of a light emitting element to emit a ray of light such as an LED; and a display panel which has adhered a polarizing plate to the longitudinal surfaces of a liquid crystal cell which has sealed a liquid crystal layer in a pair of light transmissive boards on which a transparent electrode film has been formed. The display 1 illuminates an image which is displayed on the display panel by the light source for backlight, and emits the display light L from a front surface of the display panel. The display 1 may be composed of an organic EL display or the like.

The control board 2 is a rigid circuit board on which a storage device, a computing device, and an input/output interface have been implemented. The control board 2 connects to an intra-vehicle communication network which consists of a CAN (Controller Area Network) for example; constitutes, as an image, various types of vehicle information which are input from the intra-vehicle communication network; and causes the display 1 to output the image as the display light L.

The reflection mirror 3 consists of a plane mirror 30 and a concave mirror 31. The plane mirror 30 is provided in order to adjust an optical path length from the display 1 up to the front glass FNT, and increases the optical path length to thereby form the virtual image V more forward of the vehicle. The concave mirror 31 is a reflection mirror having a curved surface which corrects distortion exerted by the curved shape of the front glass FNT, and which enlarges the display light L to project the enlarged light to the front glass FNT.

The chassis 4 is mainly composed of a lower case 40, an upper case 41, a light transmissive cover 42, and a light shading wall 43.

The lower case 40 consists of a case body obtained by die-molding aluminum, for example, and the display 1, the control board 2, and the reflection mirror 3 are secured.

The upper case 41 consists of a resin case body such as polyethylene terephthalate (PET) or polycarbonate (PC) for example. The upper case 41 and the lower case 40 engage with each other, and both of these cases house the display 1, the control board 2, and the reflection mirror 3.

In the upper case 41, a window part to which the display light L is to be emitted is formed, and at this window part, a substantially rectangular light transmissive cover 42 made of a light transmissive resin such as an acrylic resin is arranged. Inside of the upper case 41, the light shading wall 43 hanging obliquely downward from an upper part is provided, and prevents a phenomenon (washout) that external light such as sunlight SL to be incident from the window part is incident to the display 1 and then the virtual image V is hardly seen.

In respect of the respective corners of the light transmissive cover 42, when the vehicle forward inside is 42CF, the vehicle front outside is 42OF, the vehicle back inside is 42CB, and the vehicle back outside is 42OB, the light transmissive cover 42 has a curved concave surface such that the side 42BC420CB (vehicle back side B) is higher than the side 42CF42OF (vehicle front side F). By means of this curved surface, the light obtained after external light such as sunlight SL has been reflected on a surface of the light transmissive cover 42 is further reflected on a wall part of an instrument panel PNL, and the persons inside and outside the vehicle are not dazzled by the reflected light of the light transmissive cover 42.

In addition, the curved surface of the light transmissive cover 42 is inclined in the leftward and rightward directions and the inward and outward directions of the vehicle so that the side 42CF42CB (vehicle inside C) is higher than the side 42OF42OB (vehicle outside O) in accordance with the shape of the instrument panel PNL, and the corner 42OF is the lowest. It is preferable that the curved surface of the light transmissive cover 42 be designed so that the respective optical path lengths at the time of reflection from the curved surface of the light transmissive cover 42 to the instrument panel PNL are equal to each other in the leftward and rightward directions and the inward and outward directions of the vehicle.

Water discharge means 44 is formed at the periphery of the corner 42OF of the light transmissive cover 42 of the upper case 41. The water discharge means 44 is intended to discharge water to the outside so as not to allow liquid to be accumulated on the light transmissive cover 42, and as shown in FIG. 4 (*a*) for example, consists of a water discharge port 44*a* which has led to the outside of the vehicle or the inside of the instrument panel PNL.

In addition, in the upper case 41, an erected wall 45 which extends up to the instrument panel PNL is formed so as to surround the periphery of the light transmissive cover 42. This erected wall 45 comes into contact with the instrument panel PNL when the head-up display device H is arranged on the instrument panel PNL of the vehicle, and the inside of the instrument panel PNL is not allowed to be visually recognized from the outside. In addition, by means of this erected wall 45, even if liquid such as water is discharged to the light transmissive cover 42 for example, the liquid appropriately flows the corner 42OF that is the lowest of the light transmissive cover 42 and then is discharged to the outside of the vehicle via the water discharge means 44 that has been arranged at the periphery of the corner 42OF.

Figure 4:
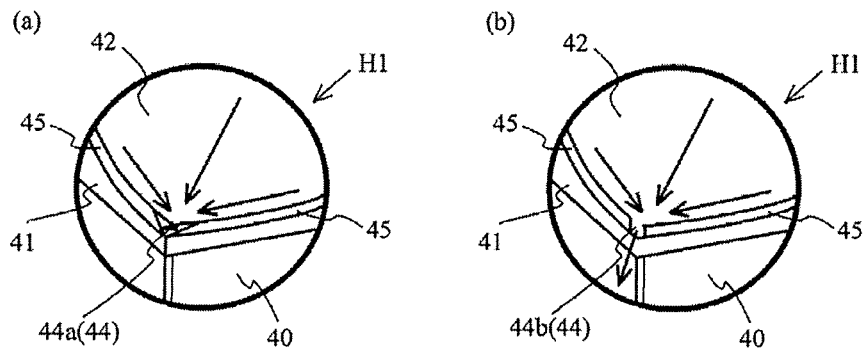
FIG. 4 is an enlarged perspective view of essential parts of the embodiment.

Incidentally, it may be that the water discharge means 44, as shown in FIG. 4 (*b*), is constructed as a water discharge groove 44*b* by cutting out the periphery of the corner 42OF of the erected wall 45 that extends up to the instrument panel PNL so as to surround the periphery of the light transmissive cover 42, and discharges the liquid to the outside so as not to allow the liquid to be accumulated on the light transmissive cover 42.

Figure 5:
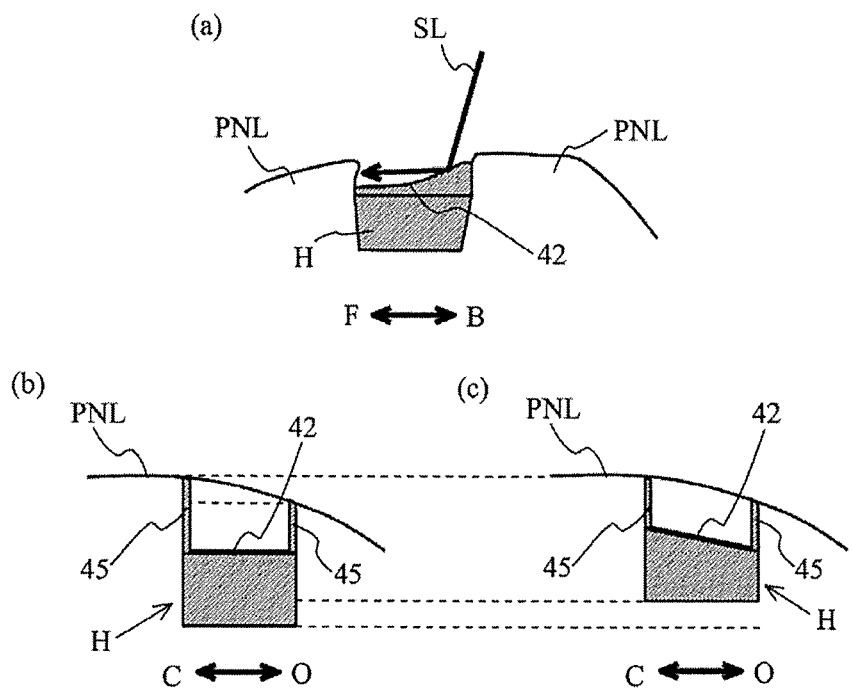
FIG. 5 is a schematic view showing a comparison between a construction of mounting to an instrument panel of a vehicle in the embodiment and that in a conventional construction.

Hereinabove, the embodiment of the present invention has been described so far. According to such a construction, an appropriate curved shape is formed such that external light such as sunlight SL having reflected the light transmissive cover 42 does not dazzle the persons inside and outside the vehicle, in accordance with the shape of the instrument panel PNL; and therefore, in comparison with the conventional head-up display device that is horizontal to the leftward and rightward directions and the inward and outward directions (the horizontal direction) of the vehicle as shown in FIG. 5 (b), the head-up display device according to the present invention as shown in FIG. 5 (c) has an excellent mountability to vehicle, since there is no need to house the head-up display device at the deep position in the instrument panel PNL.

In addition, the water discharge means 44 is provided at the periphery of a corner 42OF which is the lowest of the light transmissive cover 42, whereby, even in a case where liquid such as water is discharged onto the light transmissive cover 42 as well, the liquid appropriately gathers and flows the water discharge means 44; and therefore, water discharge property is enhanced. Further, an apprehension that the liquid flows out from a site other than the water discharge means 44 by the erected wall 45 that surrounds the periphery of the light transmissive cover 42 is reduced.

Incidentally, various improvements and design change are possible without departing from the spirit of the present invention, and for example, the projected member may be a combiner or the like without being limitative to the front glass FNT of the vehicle.

INDUSTRIAL APPLICABILITY

The present invention is preferable as a head-up display device to be mounted to a vehicle.

DESCRIPTION OF REFERENCE NUMERALS

1: Display (display means)
2: Control board (control means)
3: Reflection mirror
4: Chassis
40: Lower case
41: Upper case
42: Light transmissive cover
43: Light shading wall
44: Water discharge means
44a: Water discharge port
44b: Water discharge groove
45: Erected wall
D: Driver
FNT: Front glass (projected member)
L: Display light
PNL: Instrument panel
V: Virtual image

The invention claimed is:

1. A head-up display device mounted on an instrument panel of a vehicle, head-up display comprising:
a chassis housing an image display device that emits display light outside the chassis,
wherein the chassis comprises:
a bottom surface;
a top surface having a curved light transmissive surface;
a first lateral surface extending from the bottom surface to the curved light transmissive surface, the first lateral surface facing a front side of the vehicle;
a second lateral surface extending from the bottom surface to the curved light transmissive surface, the second lateral surface facing a center axis extending between the front side of the vehicle and a back side of the vehicle;
a third lateral surface extending from the bottom surface to the curved light transmissive surface, the third lateral surface facing the back side of the vehicle;
a fourth lateral surface extending from the bottom surface to the curved light transmissive surface, the fourth lateral surface facing away from the center axis;
a first corner where the curved light transmissive surface, the first lateral surface, and the fourth lateral surface meet;
a second corner where the curved light transmissive surface, the first lateral surface, and the second lateral surface meet;
a third corner where the curved light transmissive surface, the second lateral surface, and the third lateral surface meet;
a fourth corner where the curved light transmissive surface, the third lateral surface, and the fourth lateral surface meet;
a first length extending between the bottom surface to the first corner;
a second length extending between the bottom surface to the second corner;
a third length extending between the bottom surface to the second corner; and
a fourth length extending between the bottom surface to the second corner,
wherein the curved light transmissive surface curves so that 1) the first length is a shortest length of the first length, the second length, the third length, and the fourth length, and 2) the third length is a longest length of the first length, the second length, and the third length, and the fourth length.

2. The head-up display device according to claim 1, wherein
the first corner comprises a water discharge port for discharging liquid on the curved light transmissive surface.

3. The head-up display device according to claim 1, wherein
an erected wall is provided between the curved light transmissive surface and the instrument panel of the vehicle.

4. The head-up display device according to claim 2, wherein
an erected wall is provided between the curved light transmissive surface and the instrument panel of the vehicle.

5. The head-up display device according to claim 1, wherein
the curved light transmissive surface curves so that when the curved light transmissive surface receives a light from outside the chassis at a first point on the curved light transmissive surface and reflects the light onto the instrumental panel, the light reflecting at the first point travels for a first optical path length from the first point to the instrumental panel,
the curved light transmissive surface curves so that when the curved surface transmissive surface receives the light from outside the chassis at a second point on the curved light transmissive surface and reflects the light on to the instrumental panel, the light reflecting at the second point travels for a second optical path length from the second point to the instrumental panel, the first point and the second point are along a hypothetical line on the curved light transmissive surface, the hypothetical line being perpendicular to the center axis, a location of the first point differs from a location of the second point along the hypothetical line, and the first optical path length is equal to the second optical path length.

6. A head-up display system mounted on a vehicle, the head-up display system comprising:

an instrument panel mounted on the vehicle, the instrumental panel comprising an inclined top surface in which an amount of inclination increases as a distance from a center axis extending between a front side of the vehicle and a back side of the vehicle increase; and a chassis mounted on the instrumental panel, the chassis housing an image display device that emits display light outside the chassis, wherein the chassis comprises:
  a bottom surface;
  a top surface having a curved light transmissive surface;
  a first lateral surface extending from the bottom surface to the curved light transmissive surface, the first lateral surface facing a front side of the vehicle;
  a second lateral surface extending from the bottom surface to the curved light transmissive surface, the second lateral surface facing the center axis;
  a third lateral surface extending from the bottom surface to the curved light transmissive surface, the third lateral surface facing the back side of the vehicle;
  a fourth lateral surface extending from the bottom surface to the curved light transmissive surface, the fourth lateral surface facing away from the center axis;
  a first corner where the curved light transmissive surface, the first lateral surface, and the fourth lateral surface meet;
  a second corner where the curved light transmissive surface, the first lateral surface, and the second lateral surface meet;
  a third corner where the curved light transmissive surface, the second lateral surface, and the third lateral surface meet;
  a fourth corner where the curved light transmissive surface, the third lateral surface, and the fourth lateral surface meet;
  a first length extending between the bottom surface to the first corner;
  a second length extending between the bottom surface to the second corner;
  a third length extending between the bottom surface to the second corner; and
  a fourth length extending between the bottom surface to the second corner,
  wherein the curved light transmissive surface curves so that 1) the first length is a shortest length of the first length, the second length, the third length, and the fourth length, 2) the third length is a longest length of the first length, the second length, the third length, and the fourth length, and
  wherein the fourth length is shorter than the second length and the third length so that differences in the first length, the second length, the third length, and the fourth length conform to a shape of the inclined top surface of the instrumental panel.

7. The head-up display system according to claim 6, wherein the first lateral surface, the second lateral surface, the third lateral surface, and the fourth lateral surface are in contact with the instrumental panel.

8. The head-up display system according to claim 6, wherein the first corner comprises a water discharge port for discharging liquid on the curved light transmissive surface.

9. The head-up display device according to claim 6, wherein the curved light transmissive surface curves so that when the curved light transmissive surface receives a light from outside the chassis at a first point on the curved light transmissive surface and reflects the light onto the instrumental panel, the light reflecting at the first point travels for a first optical path length from the first point to the instrumental panel, the curved light transmissive surface curves so that when the curved surface transmissive surface receives the light from outside the chassis at a second point on the curved light transmissive surface and reflects the light on to the instrumental panel, the light reflecting at the second point travels for a second optical path length from the second point to the instrumental panel, the first point and the second point are along a hypothetical line on the curved light transmissive surface, the hypothetical line being perpendicular to the center axis, a location of the first point differs from a location of the second point along the hypothetical line, and the first optical path length is equal to the second optical path length.

10. A head-up display device comprising:

a chassis mounted on an instrumental panel of a vehicle, the chassis housing an image display device that emits display light outside the chassis, wherein the chassis comprises:
  a bottom surface;
  a top surface having a curved light transmissive surface;
  a first lateral surface extending from the bottom surface to the curved light transmissive surface, the first lateral surface facing a front side of the vehicle;
  a second lateral surface extending from the bottom surface to the curved light transmissive surface, the second lateral surface facing the center axis;
  a third lateral surface extending from the bottom surface to the curved light transmissive surface, the third lateral surface facing the back side of the vehicle;
  a fourth lateral surface extending from the bottom surface to the curved light transmissive surface, the fourth lateral surface facing away from the center axis;
  a first corner where the curved light transmissive surface, the first lateral surface, and the fourth lateral surface meet;
  a second corner where the curved light transmissive surface, the first lateral surface, and the second lateral surface meet;
  a third corner where the curved light transmissive surface, the second lateral surface, and the third lateral surface meet;
  a fourth corner where the curved light transmissive surface, the third lateral surface, and the fourth lateral surface meet;
  a first length extending between the bottom surface to the first corner;

a second length extending between the bottom surface to the second corner;

a third length extending between the bottom surface to the second corner; and a fourth length extending between the bottom surface to the second corner, wherein the curved light transmissive surface curves so that 1) the first length is a shortest length of the first length, the second length, the third length, and the fourth length, and 2) the third length is a longest length of the first length, the second length, the third length, and the fourth length, and wherein the curved light transmissive surface curves so that when the curved light transmissive surface receives a light from outside the chassis at a first point on the curved light transmissive surface and reflects the light onto the instrumental panel, the light reflecting at the first point travels for a first optical path length from the first point to the instrumental panel, wherein the curved light transmissive surface curves so that when the curved surface transmissive surface receives the light from outside the chassis at a second point on the curved light transmissive surface and reflects the light on to the instrumental panel, the light reflecting at the second point travels for a second optical path length from the second point to the instrumental panel, wherein the first point and the second point are along a hypothetical line on the curved light transmissive surface, the hypothetical line being perpendicular to the center axis, wherein a location of the first point differs from a location of the second point along the hypothetical line, and wherein the first optical path length is equal to the second optical path length.

11. The head-up display device according to claim 10, wherein the first lateral surface, the second lateral surface, the third lateral surface, and the fourth lateral surface are in contact with the instrumental panel.

12. The head-up display device according to claim 10, wherein the first corner comprises a water discharge port for discharging liquid on the curved light transmissive surface.

* * * * *